US008307132B2

(12) United States Patent  (10) Patent No.: US 8,307,132 B2
Ejiri et al.  (45) Date of Patent: Nov. 6, 2012

(54) CONTROL OF AN EXTERNAL STORAGE DEVICE WITH A PLURALITY OF STORAGE UNITS

(75) Inventors: Taichi Ejiri, Nagoya (JP); Masahiko Horibe, Nagoya (JP); Tsukasa Ito, Nagoya (JP)

(73) Assignee: Buffalo Inc., Nagoya (JP)

( * ) Notice: Subject to any disclaimer, the term of this patent is extended or adjusted under 35 U.S.C. 154(b) by 222 days.

(21) Appl. No.: 12/465,557

(22) Filed: May 13, 2009

(65) Prior Publication Data

US 2009/0287851 A1 Nov. 19, 2009

(30) Foreign Application Priority Data

May 14, 2008 (JP) .................. 2008-126890

(51) Int. Cl.
*G06F 13/00* (2006.01)
*G06F 1/26* (2006.01)
*G06F 1/28* (2006.01)
*G06F 3/048* (2006.01)
*G06F 11/30* (2006.01)
*G06F 12/00* (2006.01)

(52) U.S. Cl. .................. 710/14; 710/8; 710/15; 710/17; 710/18; 711/111; 711/112; 711/114; 713/300; 713/310; 713/320; 713/323; 713/324; 713/340; 715/700; 715/705; 715/808; 715/809; 715/810; 715/961; 715/965; 715/966; 715/967; 715/968; 715/975

(58) Field of Classification Search .................. 710/8, 14, 710/15, 17, 18; 713/300, 310, 320, 323, 713/324, 340; 715/700, 705, 808, 809, 810, 715/961, 965–968, 975; 711/111, 112, 114
See application file for complete search history.

(56) References Cited

U.S. PATENT DOCUMENTS

| 2005/0182901 A1* | 8/2005 | Suzuki et al. .................. 711/114 |
| 2007/0091497 A1 | 4/2007 | Mizuno |
| 2009/0228674 A1* | 9/2009 | Ouchi .......................... 711/168 |

FOREIGN PATENT DOCUMENTS

| JP | 62-237513 A | 10/1987 |
| JP | 08-102132 A | 4/1996 |
| JP | 2001-93220 | 4/2001 |
| JP | 2002-297320 | 10/2002 |
| JP | 2003-233466 A | 8/2003 |
| JP | 2004-152342 A | 5/2004 |

(Continued)

OTHER PUBLICATIONS

Notification of First Office Action dated Sep. 10, 2010 from Japanese application No. 200910137586.5.
Notification of Second Office Action dated Aug. 31, 2011 from Japanese application No. 200910137586.5.

(Continued)

*Primary Examiner* — Tanh Nguyen
(74) *Attorney, Agent, or Firm* — Beyer Law Group LLP

(57) ABSTRACT

A control device controls an external storage device with a plurality of storage units which can be driven and stopped independently. The control device comprises: a display control unit; a setting unit; and a control signal output unit. The display control unit displays on a display a selection screen that allows a user to select which storage unit from among the plurality of storage units to operate. The setting unit sets a storage unit selected by the user as an operating storage unit to be operated. The control signal output unit outputs to the external storage device a control signal for having the operating storage unit be operated.

15 Claims, 6 Drawing Sheets

FOREIGN PATENT DOCUMENTS

| | | |
|---|---|---|
| JP | 2004-252570 | 9/2004 |
| JP | 2005-63591 A | 3/2005 |
| JP | 2006-260109 | 9/2006 |
| JP | 2007-164738 | 6/2007 |
| JP | 2007-207089 A | 8/2007 |

OTHER PUBLICATIONS

"Hitachi Adaptable Modular Storage/Hitachi Workgroup Modular Storage" copyright Hitachi, Ltd. 2007, English translation attached.
English translation of Japanese Office Action dated May 22, 2012 from Japanese Application No. 2008-126890.

* cited by examiner

CONTROL OF AN EXTERNAL STORAGE DEVICE WITH A PLURALITY OF STORAGE UNITS

BACKGROUND

1. Technical Field

The present invention relates to technology for controlling an external storage device with a plurality of storage units.

2. Related Art

So-called external hard disk drives used connected to a computer are becoming widespread. This hard disk drive is typically driven by commercial power or by power supplied from a computer via USB.

In recent years, large capacity external storage devices that have a plurality of hard disk drives built into one case have become widespread. With this kind of external storage device, in the past, technologies were proposed that would reduce power consumption by differentiating the uses of the plurality of hard disk drives. For example, in some technology, with a disk array device equipped with a plurality of hard disks or hard disk drives, when in the energy saving mode, there is differentiation of use of the plurality of hard disk drives based on the use information of the plurality of hard disks. Also, in another technology, with a disk array device equipped with a plurality of hard disks, when in energy saving mode, there is differentiation of use of the plurality of hard disks based on the load information.

However, with the above mentioned technology, there was no consideration made for differentiation of use of the plurality of hard disk drives in cases when it is not possible to operate all of the plurality of hard disk drives with the supplied power, for example, when the power is supplied by USB to the external storage device. Specifically, with the above mentioned technology, one or more hard disk drives sometimes stop operating, because the power supplied to the plurality of hard disk drives is insufficient.

The present invention was created to address the problems noted above, and an advantage of some aspects of the invention is as follows: when controlling an external storage device equipped with a plurality of storage units, the desired storage device can be operated, when it is possible to operate only part of the plurality of storage units by the power supplied to the external storage device.

The entire disclosure of Japanese patent application No. 2008-126890 of BUFFALO is hereby incorporated by reference into this document.

SUMMARY

The present invention can be realized as the following modes or application examples to address at least part of the problems noted above.

Aspect 1.

A control device for controlling an external storage device with a plurality of storage units which can be driven and stopped independently, comprising:

a display control unit that displays on a display a selection screen that allows a user to select from among the plurality of storage units a storage unit to be operated, a setting unit that sets the storage unit selected by the user as an operating storage unit to be operated, and a control signal output unit that outputs to the external storage device a control signal for having the operating storage unit be operated.

With the control device of application Aspect 1, of the plurality of storage units the external storage device is equipped with, it is possible to operate only the storage units selected by the user. Therefore, even when it is only possible to operate part of the plurality of storage units by the power supplied to the external storage device, it is possible to reliably operate the desired storage unit selected by the user.

Aspect 2.

A control device according to Aspect 1 wherein the external storage device further comprises:

a first power input unit that receives first power capable of driving only part of the plurality of storage units;

a second power input unit that receives second power capable of driving all of the plurality of storage units; and an operation mode signal output unit that outputs to the control device a first or second operation mode signal, the first operation mode signal indicating, as an operation mode of the external storage device, a first operation mode in which the external storage device is driven by the first power, the second operation mode signal indicating, as the operation mode, a second operation mode in which the external storage device is driven by the second power, wherein the control device further comprises:

an operation mode signal input unit that receives the first or second operation mode signal from the external storage device, and the display control unit, when the operation mode signal input unit receives the first operation mode signal, displays the selection screen that allows the user to select, from among the plurality of the storage units, storage unit of a maximum number or lower that can be driven by the first power.

With the control device of Aspect 2, when the operation mode of the external storage device is in the first operation mode, the user is able to select which of the plurality of storage units to operate and which to stop. Note that as the first power, it is possible to use the power supplied via USB, for example. Also, as the second power, it is possible to use commercial power, for example. Also, the maximum number of storage units which can be operated is found by the power supplied to the external storage device and the maximum power consumption during operation of the storage unit.

Aspect 3.

A control device according to Aspect 2 wherein the display control unit displays on the selection screen the maximum number of the storage units which can be driven by the first power.

With the control device of Aspect 3, when the operation mode of the external storage device is the first operation mode, the user is able to know the maximum number of storage units that can be operated.

Aspect 4.

A control device according to Aspect 2 or 3 wherein when the operation mode signal input unit receives the second operation mode signal, the display control unit displays the selection screen that allows the user to select any storage units from among the plurality of storage units.

With the control device of Aspect 4, when the operation mode of the external storage device is in the second operation mode, the user is able to select which of the plurality of storage units to operate and which to stop. Therefore, when the operation mode of the external storage device is the second operation mode, it is possible to save power with the external storage device.

Aspect 5.

A control device according to any of Aspects 2 through 4, further comprising:

a power supply unit that supplies the first power to the external storage device.

With the control device of Aspect 5, even when it is not possible to supply the second power to the external storage device, it is possible to operate the external storage device by the first power supplied from the control device. Also, even when it is possible to supply the second power to the external storage device, it is possible to save power by operating the external storage device by the first power without supplying the second power. Also, if the external storage device is operated by the first power without supplying the second power, an adapter or cord for supplying the second power to the external storage device is not required, so it is possible to make the wiring around the device neat and simple.

Aspect 6.

A control device according to any of Aspect 1 through 5 wherein the storage unit is a hard disk drive.

In addition to the constitution as a control device described above, the present invention can also be constituted as a control method of a control device. It is also possible to realize various modes such as a program product or a recording medium on which that program that realizes the method is recorded. Note that for the respective modes, it is possible to additively apply various elements shown previously.

When the invention is constituted as a computer program product or as a recording medium on which that program is recorded, it is possible to contain an overall program that controls the operation of the control device, or only the part that performs the functions of this invention. Also, as the recording medium, it is possible to use various media that can be read by a computer such as a floppy disk, CD-ROM, DVD-ROM, magnetic optical disk, IC card, ROM cartridge, punch card, printed matter on which a code is printed such as a bar code, a computer internal storage device (memory such as RAM, ROM or the like), and external storage devices.

These and other objects, features, aspects, and advantages of the present invention will become more apparent from the following detailed description of the preferred embodiments with the accompanying drawings.

DESCRIPTION OF EXEMPLARY EMBODIMENT

Figure 1:
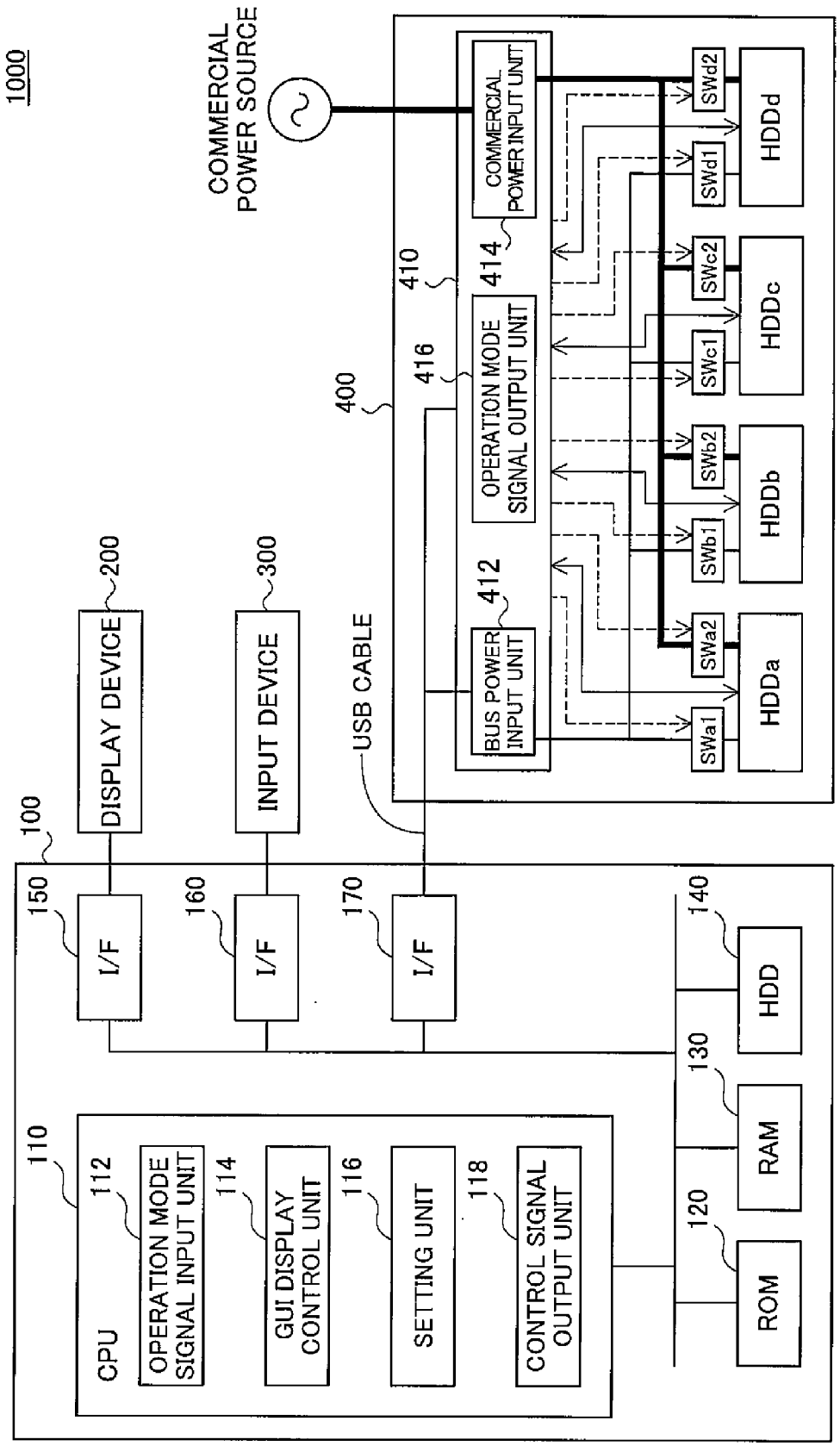
FIG. 1 depicts the schematic structure of the computer system 1000 as an embodiment of the invention.

A. System Configuration:

FIG. 1 depicts the schematic structure of the computer system 1000 as an embodiment of the invention. This computer system 1000 is equipped with a personal computer 100, a display device 200, an input device such as a mouse or keyboard 300, and an external hard disk drive 400. [0001]

The personal computer 100 is equipped with a CPU 110, a ROM 120, a RAM 130, a built in hard disk drive (HDD) 140, and interfaces (I/F) 150, 160, and 170. Also, the personal computer 100 is equipped with a power supply unit (not illustrated) for supplying power (power by USB) to the external hard disk drive 400. The external hard disk drive 400 is connected to the interface 170 via a USB cable capable of supplying power and of exchanging various signals and data. Also, the display device 200 is connected to the interface 150. Also, the input device 300 is connected to the interface 160.

The external hard disk drive 400 of this embodiment is equipped with a plurality of hard disk drives within a case. With this embodiment, the external hard disk drive 400 is equipped with four hard disk drives, specifically hard disk drives HDDa, HDDb, HDDc, and HDDd, and a control unit 410 that controls their operation. The external hard disk drive 400 can operate using the power by USB supplied from the personal computer 100 or using the commercial power supplied from a commercial power supply. However, though the external hard disk drive 400 is able to operate all the hard disk drives HDDa, HDDb, HDDc, and HDDd with the commercial power, it can only operate one hard disk drive of the hard disk drives HDDa, HDDb, HDDc, and HDDd with the power by USB. Therefore, as will be described later, the setting process of setting which of the hard disk drives among the hard disk drives HDDa, HDDb, HDDc, and HDDd to operate is performed with the computer system 1000 of this embodiment. The operation mode when the external hard disk drive 400 operates using the power by USB is called the "bus power mode," and the operation mode when the external hard disk drive 400 operates using the commercial power is called the "commercial power mode." When commercial power is supplied to the commercial power input unit 414, the external hard disk drive 400 operates with the commercial power mode having priority.

The control unit 410 is equipped with a bus power input unit 412 that receives the power by USB, a commercial power input unit 414 that receives the commercial power, and an operation mode signal output unit 416 for outputting the operation mode signal indicating that the external hard disk drive 400 will operate in the bus power mode, or an operation mode signal indicating that the external hard disk drive 400 will operate in the commercial power mode. As will be described later, the operation mode signal output unit 416 outputs the operation mode signal indicating that the external hard disk drive 400 will operate in the commercial power mode when the commercial power is input to the commercial power input unit 414. The operation mode signal output unit 416 outputs the operation mode signal indicating that the external hard disk drive 400 will operate in the bus power mode when the commercial power is not input to the commercial power input unit 414. These outputs of the operation mode signals are made according to the request from the personal computer 100.

The bus power input unit 412 and the hard disk drives HDDa, HDDb, HDDc, and HDDd are respectively connected via switches SWa1, SWb1, SWc1, and SWd1. Also, the commercial power input unit 414 and the hard disk drives HDDa, HDDb, HDDc, and HDDd are respectively connected via the switches SWa2, SWb2, SWc2, and SWd2. These switches SWa1, SWb1, SWc1, and SWd1 and switches SWa2, SWb2, SWc2, and SWd2 are respectively turned off in the initial state, and are respectively controlled to turn on and off by the control unit 410 according to control signals described later which are received from the personal computer 100.

Note that though an illustration is omitted, the control unit 410 is equipped with (i) an interface for performing exchange of various signals and data between the personal computer 100 and the four hard disk drives HDDa, HDDb, HDDc, and HDDd, (ii) a drive control unit for performing drive control of the motor and head equipped in the four hard disk drives HDDa, HDDb, HDDc, and HDDd, and (iii) a read/write control unit for controlling reading of data from the four hard disk drives HDDa, HDDb, HDDc, and HDDd and writing of data to the four hard disk drives HDDa, HDDb, HDDc, and HDDd, and the like.

Stored in the built in hard disk drive 140 of the personal computer 100 are an operating system, various utility software, various application software, and various data files.

The CPU 110 is equipped with the operation mode signal input unit 112, the GUI (graphical user interface) display control unit 114, the setting unit 116, and the control signal output unit 118. Each of these units are constituted by the CPU 110 reading of the specified utility software stored in the built in hard disk drive 140 and executing them under the operating system.

The operation mode signal input unit 112 receives the operation mode signal output from the external hard disk drive 400. The GUI display control unit 114 displays on the display device 200 a selection screen for the user to select which of the hard disk drives to operate of the hard disk drives HDDa, HDDb, HDDc, or HDDd based on the operation mode signal input to the operation mode signal input unit 112. The setting unit 116 sets the hard disk drive selected by the user on the selection screen as the hard disk drive to be operated. The control signal output unit 118 outputs to the external hard disk drive 400 control signals to operate the hard disk drive set at the setting unit 116, specifically, control signals for switching the on/off state of the switches SWa1, SWb1, SWc1, SWd1 and SWa2, SWb2, SWc2, SWd2. Following the setting process with each of these units is described.

Figure 2:
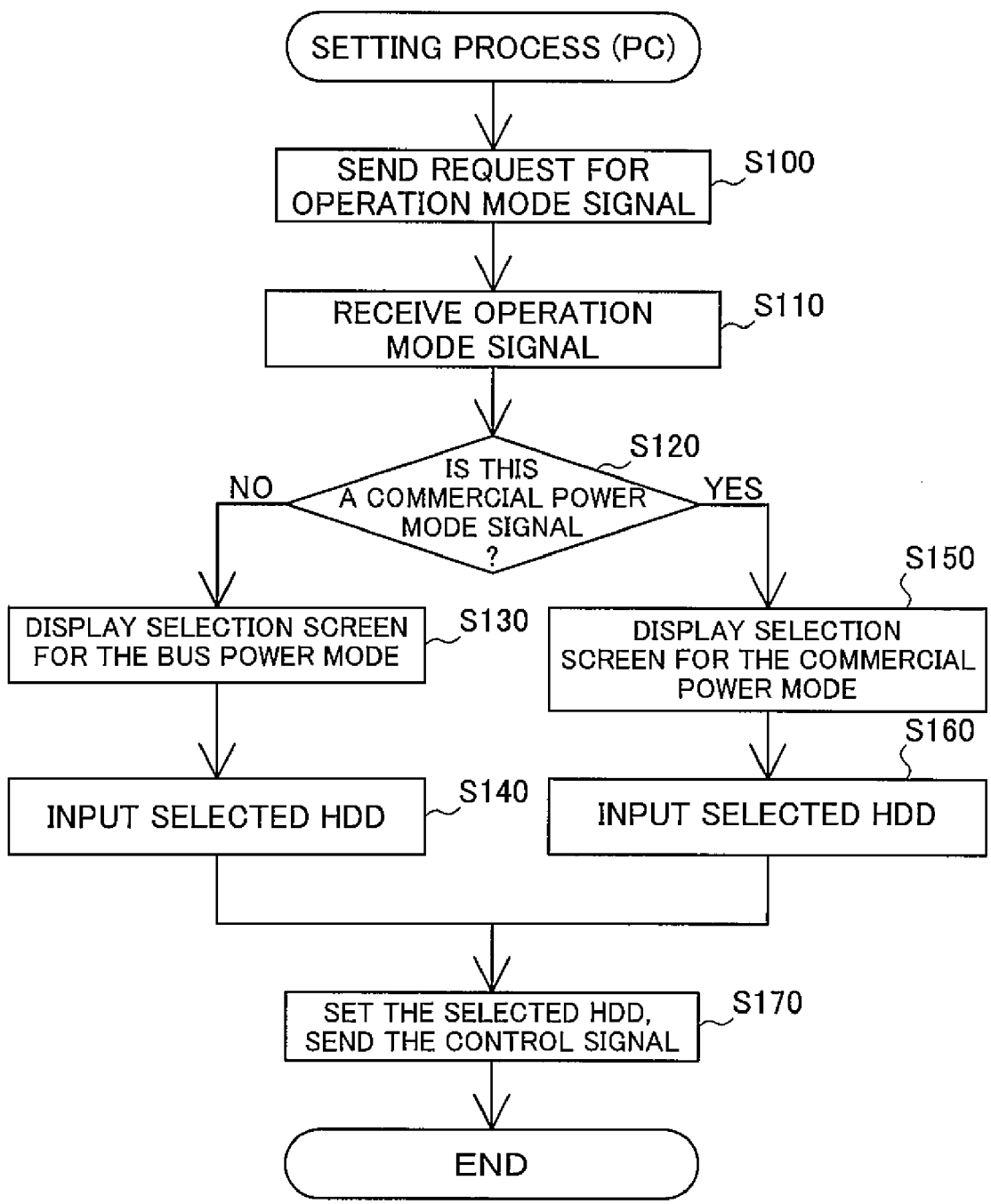
FIG. 2 is a flow chart showing the flow of the setting process for setting the hard disk drive to be operated with the computer system 1000.
Figure 3:
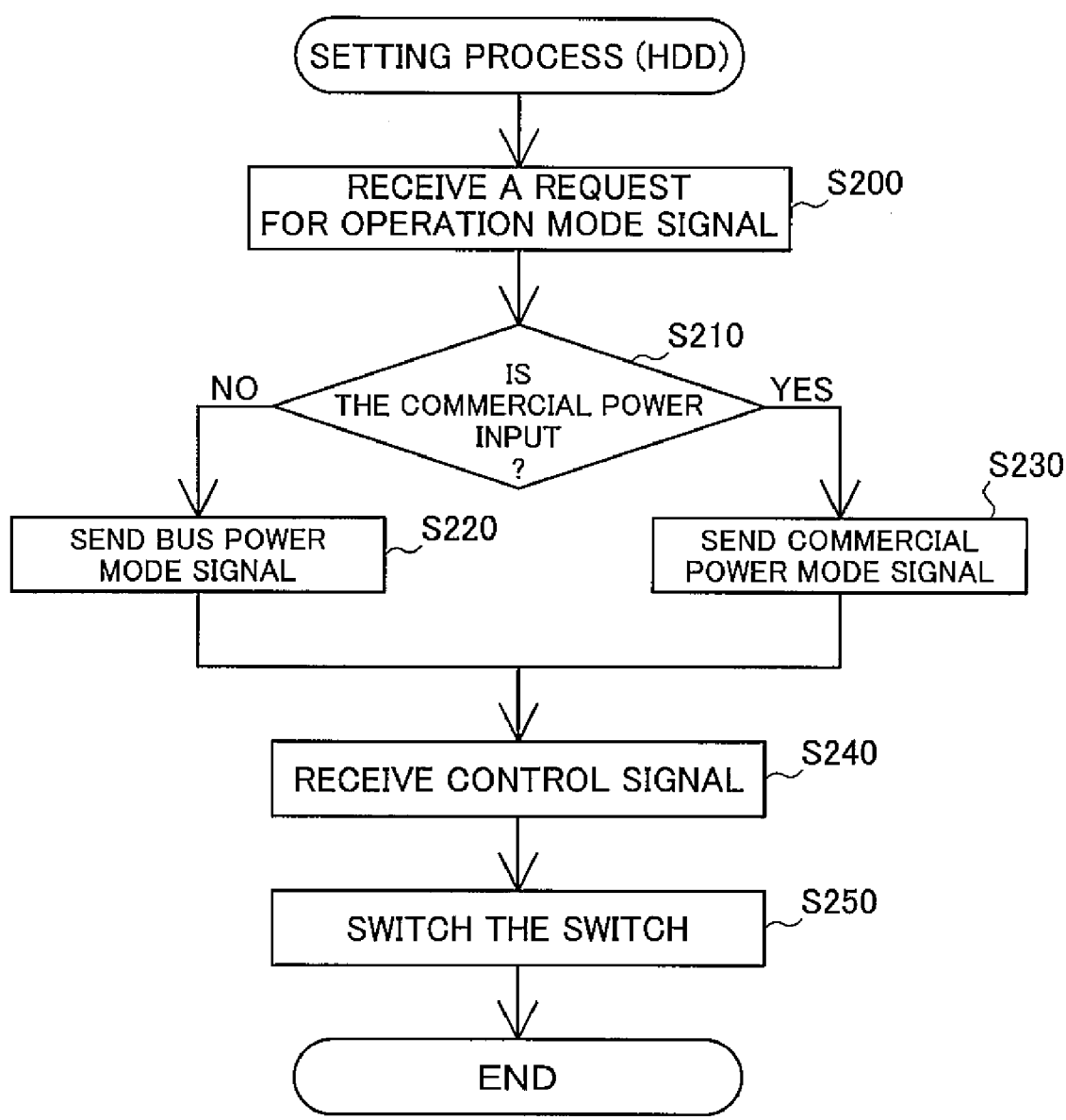
FIG. 3 is a flow chart showing the flow of the setting process for setting the hard disk drive to be operated with the computer system 1000.

B. Setting Process:

FIGS. 2 and 3 are flow charts showing the flow of the setting process for setting the hard disk drive to be operated with the computer system 1000. These setting processes are executed as necessary according to instructions by the user. FIG. 2 shows the flow of the process executed by the personal computer (PC) 100. FIG. 3 shows the flow of the process executed by the external hard disk drive (HDD) 400.

When this process starts, first, the CPU 110 of the personal computer 100 sends a request for an operation mode signal to the external hard disk drive 400 (step S100).

When the control unit 410 of the external hard disk drive 400 receives the request for the operation mode signal from the personal computer 100 (step S200), it judges whether or not commercial power is supplied to the commercial power input unit 414 (step S210). Then, when commercial power has not been supplied to the commercial power input unit 414 (step S210: No), the control unit 410 sends to the personal computer 100 an operation mode signal indicating that the operation mode is the bus power mode using the operation mode signal output unit 416 (step S220). The operation mode signal indicating the bus power mode is hereinafter referred to as the "bus power mode signal". Meanwhile, when commercial power has been supplied to the commercial power input unit 414 (step S210: Yes), the control unit 410 sends to the personal computer 100 an operation mode signal indicating that the operation mode is the commercial power mode using the operation mode signal output unit 416 (step S230). The operation mode signal indicating the commercial power mode is hereinafter referred to as the "commercial power mode signal".

When the CPU 110 of the personal computer 100 receives the operation mode signal from the external hard disk drive 400 (step S110), it judges whether or not that operation mode signal is the commercial power mode signal (step S120). Then, when the input operation mode signal is the bus power mode signal (step S120: No), the CPU 110 displays on the display device 200 the selection screen for the bus power mode using the GUI display control unit 114 (step S130).

Figure 4:
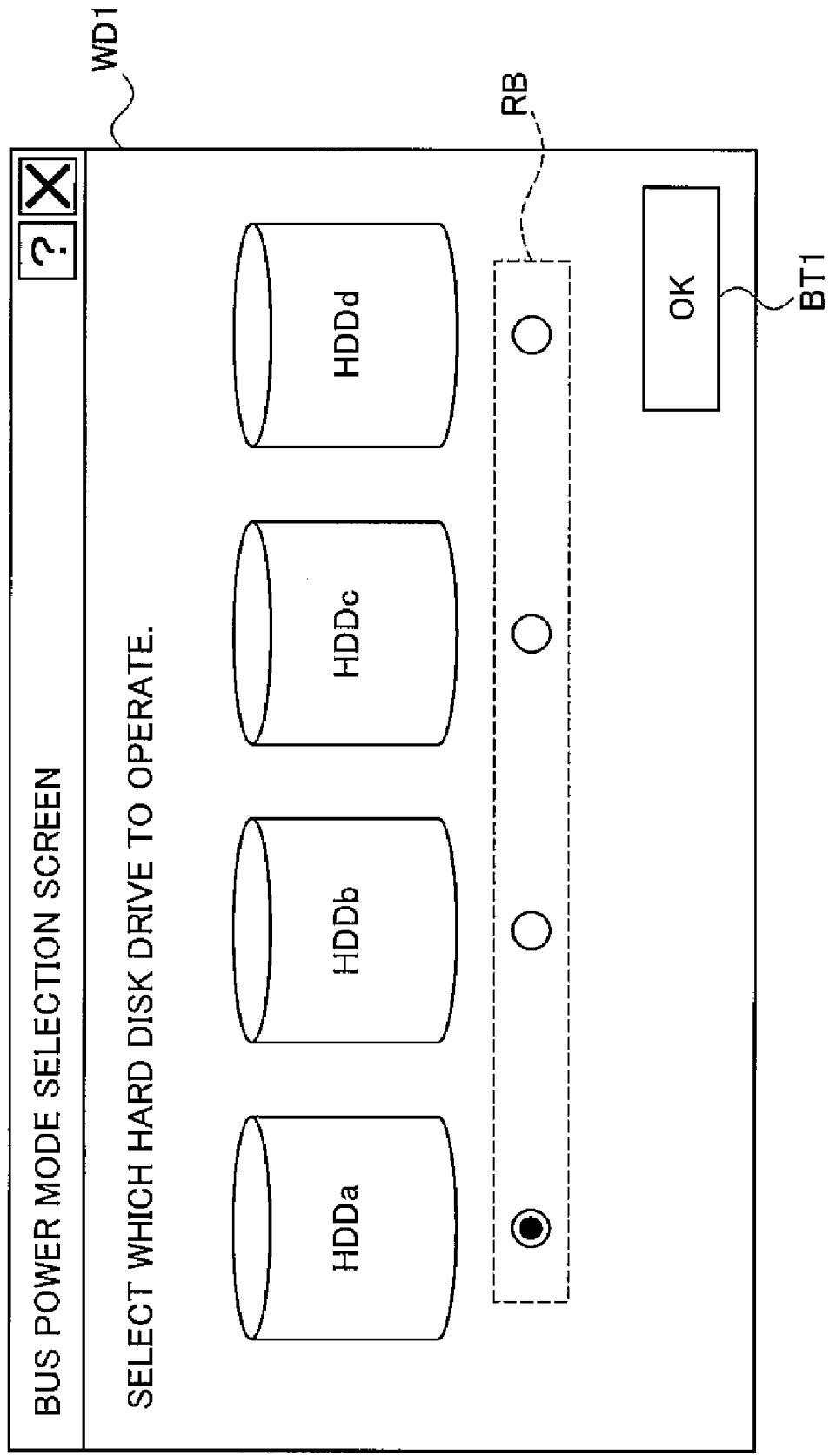
FIG. 4 depicts an example of the bus power mode selection screen WD1.

FIG. 4 depicts an example of the bus power mode selection screen WD1. Displayed on this bus power mode selection screen WD1 are (i) a radio button RB for the user to select one hard disk drive to operate from among the hard disk drives HDDa, HDDb, HDDc, and HDDd, and (ii) an OK button BT1 for confirming the selected results. With the example shown in the drawing, the state of the hard disk drive HDDa being selected as the hard disk drive to be operated is shown.

On the bus power mode selection screen WD1, when the hard disk drive to be operated is selected by the user and the OK button BT1 is pressed, the CPU 110 receives the selection of the hard disk drive (step S140 of FIG. 2). Then the setting unit 116 sets the selected hard disk drive as the hard disk drive to be operated, and the control signal output unit 118 sends the control signal to operate that hard disk drive to the external hard disk drive 400 (step S170). With the example shown in FIG. 4, a control signal is sent that has the external hard disk drive 400 switch SWa1 turned on, and switches SWb1, SWc1, and SWd1, as well as switches SWa2, SWb2, SWc2, and SWd2 turned off.

At step S120, when the input operation mode signal is the commercial power mode signal (step S120: Yes), the CPU 110 displays on the display device 200 the selection screen for the commercial power mode using the GUI display control unit 114 (step S150).

Figure 5:
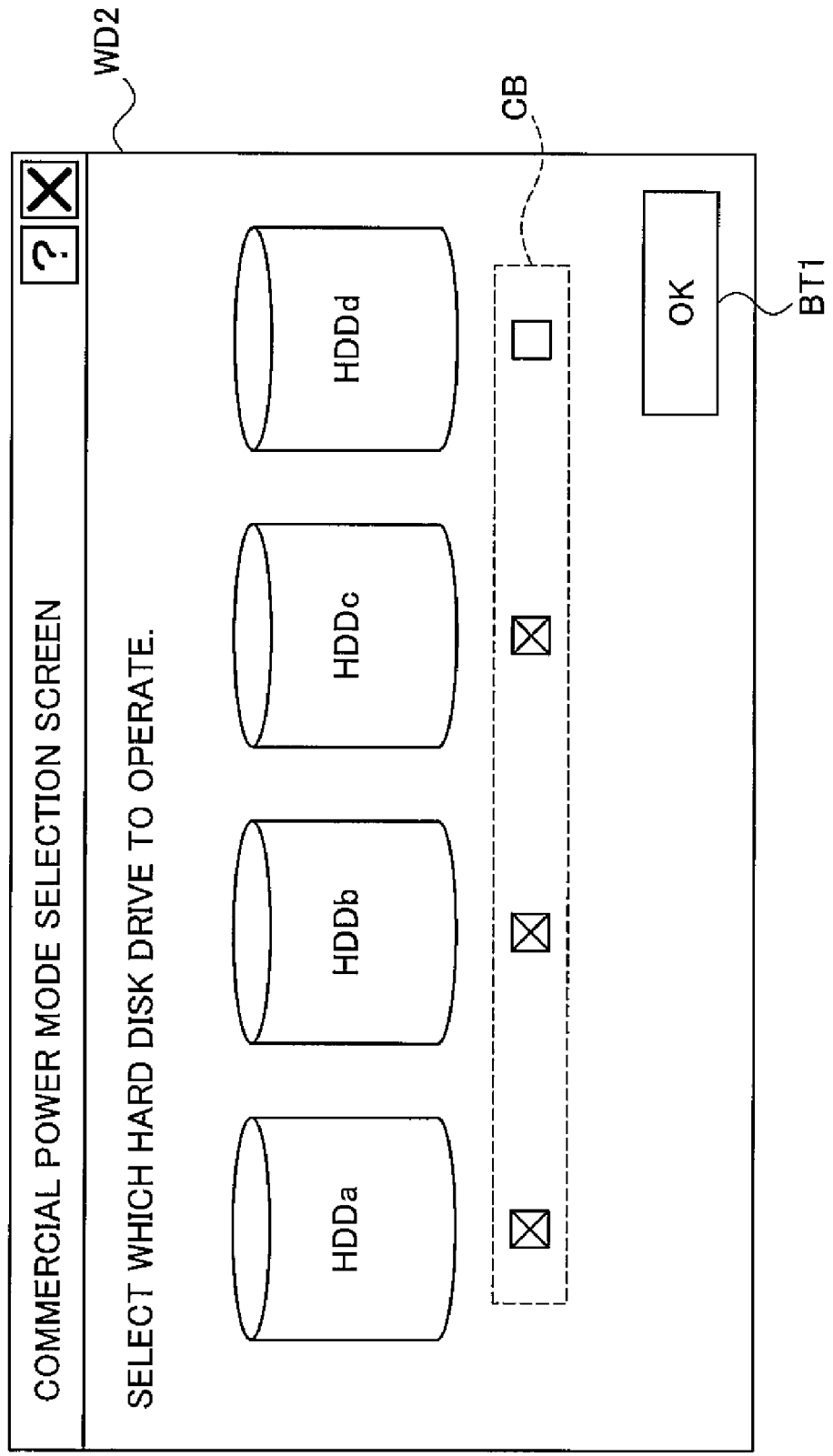
FIG. 5 depicts an example of the commercial power mode selection screen WD2.

FIG. 5 is an explanatory drawing showing an example of the commercial power mode selection screen WD2. Displayed on this commercial power mode selection screen WD2 are a check box CB for the user to freely select the hard disk drive to be operated from among the hard disk drives HDDa, HDDb, HDDc, and HDDd, and an OK button BT1 for confirming the selection results. With the example in the drawing, shown is a state for which the three hard disk drives HDDa, HDDb, and HDDc are selected as the hard disk drives to be operated.

When the hard disk drive to be operated is selected by the user on the commercial power mode selection screen WD2 and the OK button BT1 is pressed, the CPU 110 receives the selection of the hard disk drive (step S160 in FIG. 2). Then the setting unit 116 sets the selected hard disk drive as the hard disk drive to be operated, and the control signal output unit 118 sends the control signal to operate that hard disk drive to the external hard disk drive 400 (step S170). With the example shown in FIG. 5, a control signal is sent that turns on the switches SWa2, SWb2, and SWc2, and that turns off the switches SWa1, SWb1, SWc1, SWd1, and SWd2.

When the control unit 410 of the external hard disk drive 400 receives the control signal described above from the personal computer 100, it switches the on/off state of the switches SWa1, SWb1, SWc1, and SWd1, as well as switches SWa2, SWb2, SWc2, and SWd2 according to that control signal (step S250). Then, the setting process ends.

With the computer system 1000 described above, of the plurality of hard disk drives in the external hard disk drive 400, it is possible to operate only the hard disk drives which are operable by the supplied power and selected by the user.

Therefore, even when it is possible to operate only part of the plurality of hard disk drives by the power supplied to the external hard disk drive 400, it is possible to reliably operate the desired hard disk drive selected by the user.

Also, with the computer system 1000 of the embodiment noted above, even in a use environment for which it is not possible to supply commercial power to the external hard disk drive 400, it is possible to operate the external hard disk drive 400 using the power supplied from the personal computer 100 by USB. Also, even in a use environment for which it is possible to supply commercial power to the external hard disk drive 400, it is possible to save power by operating the external hard disk drive 400 using the power by USB without consuming commercial power. Also, if the external hard disk drive 400 is operated using the power by USB without consuming commercial power, because an adapter or cord is not needed for supplying commercial power to the external hard disk drive 400, it is possible to make the wiring around the device neat and simple.

C. Variation Examples

Above, several modes of the invention are described, but this invention is not limited to this kind of implementation mode, and it is possible to implement various modes within a scope that does not stray from the key points. For example, the following kinds of variations are possible.

C1. Variation Example 1

With the computer system 1000 of the embodiment noted above, the personal computer 100 and the external hard disk drive 400 are connected by a USB cable, and when the operation mode is the bus power mode, the external hard disk drive 400 was made to only operate one hard disk. However, the present invention is not limited to such embodiment. It is also possible to connect the personal computer 100 and the external hard disk drive 400, for example, using an IEEE 1394 cable, an eSATA cable, a LAN cable instead of the USB cable, and to operate a plurality (two, for example) of hard disk drives using the power by USB.

Figure 6:
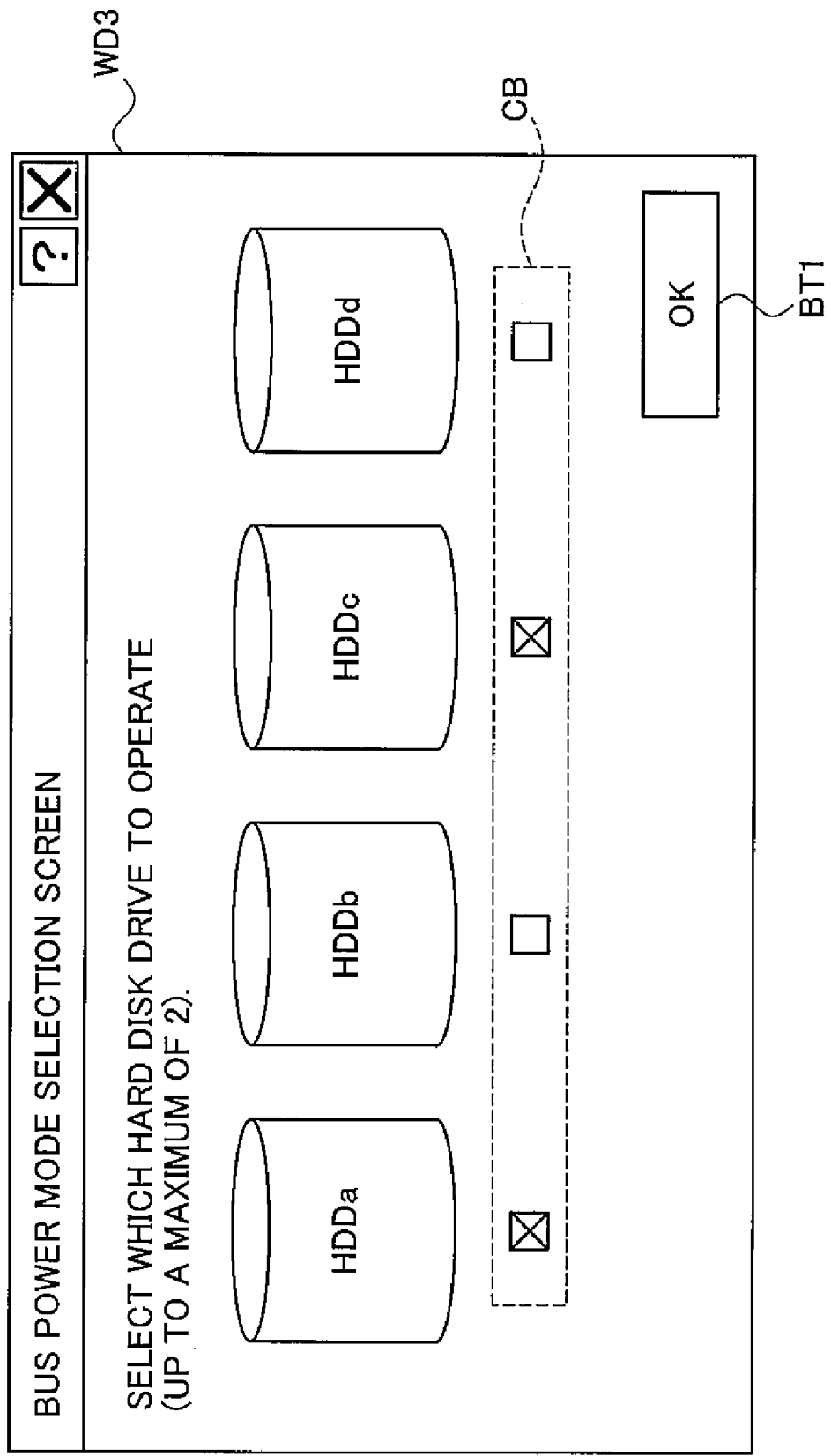
FIG. 6 depicts an example of a bus power mode selection screen WD3 as a variation example.

FIG. 6 depicts an example of a bus power mode selection screen WD3 as a variation example. Displayed on this bus power mode selection screen WD3 are a check box CB for the user to select two or less hard disk drives to operate from among the hard disk drives HDDa, HDDb, HDDc, and HDDd, and an OK button BT1. Also, the maximum number of hard disk drives that can be operated by the power by USB is displayed on the bus power mode selection screen WD3. With the example in the drawing, the number of hard disk drives that can be operated is shown as "Up to a maximum of 2." By working in this way, when the operation mode of the external hard disk drive 400 is the bus power mode, the user can know the maximum number of hard disk drives that can be operated.

C2. Variation Example 2

With the embodiment noted above, the external hard disk drive 400 was equipped with a power by USB input unit 412 and a commercial power input unit 414, and it was possible to operate he hard disk drives HDDa, HDDb, HDDc, and HDDd using both the bus power by USB and the commercial power, but the present invention is not limited to this. For example, it is also possible to have the external hard disk drive 400 not be equipped with the commercial power input unit 414, or the switches SWa2, SWb2, SWc2, SWd2, and to operate the hard disk drives HDDa, HDDb, HDDc, HDDd using only the power by USB. In this case, steps S100, S110, S120, S150, and S160 in FIG. 2 and steps S200, S210, S220, and S230 in FIG. 3 are omitted.

C3. Variation Example 3

With the computer system 1000 of the embodiment noted above, with the setting process, the selection screen for the user to select which of the plurality of hard disk drives to operate was switched according to whether the operation mode of the external hard disk drive 400 is the bus power mode or the commercial power mode. However, the present invention is not limited to this. It is also possible to have the user select which of the plurality of hard disk drives to operate regardless of the operation mode of the external hard disk drive 400.

C4. Variation Example 4

With the embodiment noted above, we described a case of applying this invention to the personal computer 100 which controls the external hard disk drive 400 which has the plurality of hard disk drives HDDa, HDDb, HDDc, and HDDd built in. However, the present invention is not limited to this. It is also possible to apply this invention to a control device for controlling an external storage device which has a plurality of storage units such as a hard disk drive, MO drive, CD drive, DVD drive or the like built in, for example.

C5. Variation Example 5

The Program product may be realized as many aspects. For example:

(i) Computer readable medium, for example the flexible disks, the optical disk, or the semiconductor memories;

(ii) Computer including the computer readable medium, for example the magnetic disks or the semiconductor memories; and (iii) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A control device for controlling an external storage device with a plurality of storage units, the external storage device having at least two power modes in which in each of the at least two power modes the plurality of storage units can be driven and stopped independently, comprising:

a display control unit that displays on a display a selection screen to allow a user to select from among the plurality of storage units at least one of the plurality of storage units to be operated;

a setting unit that sets a storage unit selected by the user as an operating storage unit to be operated; and a control signal output unit that outputs to the external storage device a control signal for having the operating storage unit be operated; wherein when the control device receives from the external storage device a first power mode signal indicating a first power mode of the external storage device in which the external storage device is driven by a first power capable of driving only one of the plurality of storage units, the display control unit displays the selection screen that allows the user to select, from among the plurality of the storage units, any individual one of the plurality of storage units to be the only storage unit driven by the first power.

2. A control device according to claim 1 wherein
the display control unit displays on the selection screen an indication that only one of the plurality of storage units can be driven by the first power.

3. A control device according to claim 1 wherein
when the control device receives from the external storage device a second power mode signal indicating a second power mode of the external storage device in which the external storage device is driven by a second power capable of driving all of the plurality of storage units, the display control unit displays the selection screen that allows the user to select any number of storage units from among the plurality of storage units.

4. A control device according to claim 1, further comprising:
a power supply unit that supplies the first power to the external storage device.

5. A control device according to claim 1 wherein
the plurality of storage units are hard disk drives.

6. A control method for controlling an external storage device with a plurality of storage units, the external storage device having at least two power modes in which in each of the at least two power modes the plurality of storage units can be driven and stopped independently, the method comprising:
receiving from the external storage device a first power mode signal indicating a first power mode of the external storage device in which the external storage device is driven by a first power capable of driving only one of the plurality of storage units;
displaying on a display a selection screen that allows a user to select from among the plurality of storage units one of the plurality of storage units to be operated, wherein the display allows the user to select, from among the plurality of the storage units, any individual one of the plurality of storage units to be the only storage unit driven by the first power;
setting a storage unit selected by the user as an operating storage unit to be operated; and
outputting to the external storage device a control signal for having the operating storage unit be operated.

7. A computer program product for controlling an external storage device with a plurality of storage units having at least two power modes, wherein in each of the at least two power modes the plurality of storage units can be driven and stopped independently, the computer program product comprising:
a non-transitory computer readable medium; and
a computer program stored on the non-transitory computer readable medium,
the computer program comprising:
a portion for receiving from the external storage device a first power mode signal indicating a first power mode of the external storage device in which the external storage device is driven by a first power capable of driving only one of the plurality of storage units;
a portion for displaying on a display a selection screen that allows a user to select from among the plurality of storage units one of the storage units to be operated, wherein the display allows the user to select, from among the plurality of the storage units, any individual one of the plurality of storage units to be the only storage unit driven by the first power,
a portion for setting a storage unit selected by the user as an operating storage unit to be operated; and
a portion for outputting to the external storage device a control signal for having the operating storage unit be operated.

8. A control device according to claim 1 wherein
the control signal simultaneously works to have the operating storage unit be operated and have storage units other than the operating storage unit be stopped.

9. A control method according to claim 6 wherein
the external storage device further comprises:
a first power input unit that receives first power capable of driving only one of the plurality of storage units;
a second power input unit that receives second power capable of driving all of the plurality of storage units; and
an power mode signal output unit that outputs to the control device a first or second power mode signal, the first power mode signal indicating, as an power mode of the external storage device, a first power mode in which the external storage device is driven by the first power, the second power mode signal indicating, as the power mode, a second power mode in which the external storage device is driven by the second power; wherein
the method further comprises:
receiving the second power mode signal from the external storage device; and
the displaying the selection screen includes:
displaying, in response to receiving the second power mode signal, the selection screen that allows the user to select any number of storage units from the plurality of storage units.

10. A computer program product according to claim 7 wherein the external storage device further comprises:
a first power input unit that receives first power capable of driving only one plurality of storage units;
a second power input unit that receives second power capable of driving all of the plurality of storage units; and
an power mode signal output unit that outputs to the control device a first or second power mode signal, the first power mode signal indicating, as an power mode of the external storage device, a first power mode in which the external storage device is driven by the first power, the second power mode signal indicating, as the power mode, a second power mode in which the external storage device is driven by the second power; wherein
the computer program further comprises:
a portion for receiving the first or second power mode signal from the external storage device; and
the portion for displaying the selection screen includes:
displaying, in response to receiving the second power mode signal, the selection screen that allows the user to select any number of storage units from the plurality of storage units.

11. A control device for controlling an external storage device with a plurality of storage units, the external storage device having at least two power modes in which in each of the at least two power modes the plurality of storage units can be driven and stopped independently, comprising:
a display control unit that displays on a display a selection screen chosen from a plurality of selection screens to allow a user to select, from among the plurality of storage units at least one of the plurality of storage units to be operated;
a setting unit that sets a storage unit selected by the user as an operating storage unit to be operated; and
a control signal output unit that outputs to the external storage device a control signal for having the operating storage unit be operated;

wherein when the control device receives from the external storage device a signal indicative of a first power mode of the external storage device in which the external storage device is driven by a first power capable of driving no more than one of the plurality of storage units, the display control unit in response displays a selection screen for the first power mode that allows the user to select, from among the plurality of the storage units, which one of the plurality of storage units to be operated.

12. The control device of claim 11, wherein when the control device receives from the external storage device a signal indicative of a second power mode in which the external storage device is driven by a second power capable of driving all of the plurality of storage units, the display control unit displays a second selection screen that allows a user to freely select any number of the plurality of storage units to be operated.

13. A control device for controlling an external storage device with a plurality of storage units, the external storage device having a first power mode and a second power modes, where in each of the first and second power modes the plurality of storage units can be driven and stopped independently, comprising:
 a display control unit that displays on a display a selection screen to allow a user to select from among the plurality of storage units at least one of the plurality of storage units to be operated;
 the control device configured to adjust the selection screen in response to receiving from the external storage device a signal indicative of whether the external storage device is in the first power mode or the second power mode:
 1) a first selection screen being displayed for the first power mode in which the external storage device is driven by a first power capable of driving no more than one of the plurality of storage units, the first selection screen allowing the user to select any individual one of the plurality of storage units as the only storage unit to be driven; and
 2) a second selection screen being displayed for the second power mode in which the external storage device is driven by a second power capable of driving all of the plurality of storage units, the second selection screen allowing the user to select any number of the plurality of storage units to be driven;
 wherein the control device commands the external storage device to set one or more of the plurality of storage units to be operated based on the selection of the user.

14. A control method for controlling an external storage device with a plurality of storage units having at least two power modes, in which in each of the at least two power modes the plurality of storage units can be driven and stopped independently, comprising:
 receiving from the external storage device a signal indicating whether the external storage device is operating in a first power mode in which the external storage device is driven by a first power capable of driving only one of the plurality of storage units or in a second power mode in which the external storage device is driven by a second power capable of driving all of the plurality of storage units;
 displaying for the first power mode a first selection screen that allows a user to select from among the plurality of storage units any one of the plurality of storage units as the only storage unit to be operated;
 setting a storage unit selected by the user as an operating storage unit to be operated; and
 outputting to the external storage device a control signal for having the operating storage unit be operated.

15. The control method of claim 14, further comprising displaying for the second power mode a second selection screen that allows a user to freely select from among the plurality of storage units any number of storage units to be operated.

* * * * *